United States Patent
Martin et al.

(10) Patent No.: US 6,577,770 B1
(45) Date of Patent: Jun. 10, 2003

(54) SYSTEM AND METHOD FOR A MULTIDIMENSIONAL, DISCRETE WAVELET-TRANSFORMATION

(75) Inventors: Uwe Erik Martin, Proetzel (DE); Reinhard Roesel, Berlin (DE); Michael Thierschmann, Berlin (DE)

(73) Assignee: LuraTech Gesellschaft fuer Luft-und Raumfahrttechnologie & Multimedia mbH, Berlin (DE)

( * ) Notice: Subject to any disclaimer, the term of this patent is extended or adjusted under 35 U.S.C. 154(b) by 0 days.

(21) Appl. No.: 09/494,829

(22) Filed: Jan. 31, 2000

Related U.S. Application Data (63) Continuation of application No. PCT/DE98/02958, filed on Oct. 5, 1998, now abandoned.

(30) Foreign Application Priority Data

Oct. 8, 1997 (DE) .......................... 197 44 407

(51) Int. Cl.⁷ ................................. G06K 9/36

(52) U.S. Cl. ..................................... 382/240

(58) Field of Search ................. 382/232, 236, 382/238, 240, 242, 248, 250; 358/432, 433; 348/384.1, 394.1, 395.1, 400.1–404.1, 407.1–416.1, 420.1, 421.1, 425.2, 430, 431; 341/51, 63, 65, 67, 107; 364/724.011, 724.04, 724.05, 724.13, 724.14, 725.01, 725.02; 375/240.02, 240.03, 240.11–240.16, 240.18–240.2, 240.22–240.25

(56) References Cited

U.S. PATENT DOCUMENTS

| | | | |
|---|---|---|---|
| 5,537,493 A | 7/1996 | Wilkinson | 382/240 |
| 5,748,786 A | 5/1998 | Zandi et al. | 382/240 |
| 5,867,602 A | 2/1999 | Zandi et al. | 382/248 |
| 6,141,446 A * | 10/2000 | Boliek et al. | 382/233 |
| 6,314,452 B1 * | 11/2001 | Dekel et al. | 709/203 |
| 6,229,929 B1 * | 5/2002 | Lynch et al. | 382/268 |
| 6,442,733 B1 * | 8/2002 | Fujiwara et al. | 716/4 |

FOREIGN PATENT DOCUMENTS

| | | |
|---|---|---|
| DE | 25 42 845 | 9/1975 |
| DE | 195 34 730 | 9/1995 |
| DE | 196 26 615 | 7/1996 |

OTHER PUBLICATIONS

M. Antonini, et al. "Image coding Using Wavelet Transform," IEEE Transactions on Image Processing, vol. 1, No. 2, Apr. 1, 1992, pp. 205–222, XP000367547.

O. Simmert, et al. "Prioritatscodiertes Verfahren Zur Datenkomprimierung" IK Ingenieur der Kommunikationstechnik, Bd. 47, Nr. 2, Mar. 1, 1997, pp. 39–42 XP000690239.

(List continued on next page.)

Primary Examiner—Jose L. Couso
(74) Attorney, Agent, or Firm—Squire, Sanders & Dempsey, L.L.P.

(57) ABSTRACT

The invention can be used in a wide range of fields including space applications, for observing, measuring and surveying the earth surface with satellites, civilian and military aeronautics, for x-ray images and security applications, as well as in general industrial image processing and image generation applications.

The invention uses the advantages of the wavelet transformation, a mathematical mapping between spaces, and in particular the advantages of interpolating wavelets, to improve the transmission of endless, continually growing, non-bordered images using a small amount of memory.

The invented procedure and the proposed implementation of the procedure describe a complete wavelet transformation system which is used as a decorrelating transformation for digital or digitized input data.

The invention also covers an inverse wavelet transformation system for reverting the wavelet transformation system operations.

11 Claims, 5 Drawing Sheets

Block Diagram of the Complete Unit for a Single-stage, Two-dimensional Transformation Unit

OTHER PUBLICATIONS

LuraTech Brochure, "Image compression by LuraTech," (no date indicated).

LuraTech Brochure, "Visual Media & compression Solutions," 1999.

"Bildkompression: Image Compression" Easy Software Magazine, No. 19, Mar. 1999, p. 36 and attachments.

PCT International Preliminary Examination Report for PCT/DE98/02958.

PCT Mitteilung Uber Die Ubermittlung Des Internationglen Recherchenberichts Oder Der Erk Larung and PCT Internationaler Recherchenbericht for PCT/DE98/02958.

* cited by examiner

FIG. 1  Wavelet Transformation Using a Pair of Analysis Filters

FIG. 2  Inverse Wavelet Transformation Using a Pair of Reconstruction Filters

FIG. 3  Multi-stage Wavelet Transformation

FIG. 4  The Prediction Step of a Lossy, Interpolating Wavelet Transformation

FIG. 5  Computation of the High-pass Coefficients (Predict Step) of a Lossless Interpolating Wavelet Transformation FIG. 6  Basic Computation Unit of a One-dimensional Transformation (Implemented Version)

FIG. 7  Block Diagram of the Complete Unit for a Single-stage, Two-dimensional Transformation Unit FIG. 8  Circuit Diagram of the Horizontal Filter Unit of the Transformation Stage FIG. 9  Circuit Diagram of the Vertical Stage of a Single-stage Transformation Unit

SYSTEM AND METHOD FOR A MULTIDIMENSIONAL, DISCRETE WAVELET-TRANSFORMATION

RELATED APPLICATION

This is a continuation of International Application PCT/DE98/02958, with an international filing date of Oct. 5, 1998, now abandoned.

TECHNICAL FIELD OF THE APPLICATION

This invention concerns a procedure for multidimensional, discrete wavelet-transformation, for example, digital or digitized analog data with interpolated wavelets, as well as a transformation unit to implement the procedure, which may be used, for example, for subsequent data compression.

BACKGROUND OF THE INVENTION

The transformation of digital data or digitized analog data into different frequency bands using conventional wavelet transformation currently offers the best basis for the lossless compression of large, accumulating amounts of data, for example in long-range transmission and processing. Data compression using conventional wavelet transformation techniques is only possible, however, when the compressed signal is stored in segmented form. As in segmented image signals, the individual segments (of a whole image or a contained, partial image). are first sampled and compressed by line from left to right and then completely from top to bottom several times. Until now, conventional wavelet transformation techniques have not been able to compress image data from satellites or other infinite image data streams without splitting the theoretically endless image size into an endless number of image regions or segments. For this reason, the high image quality and transmission speed achieved by conventional wavelet transformation techniques in the transmission of compressed image data has not yet been achieved in the transmission of infinite, continuously accumulating images.

An example of a conventional wavelet transmission technique is disclosed in German patent application DE 196 26 615. In DE 196 26 615, first, a data stripe with several lines (see FIG. 22 of DE 196 26 615) is processed using simple, reversible S- and TS-wavelets. In this process data for the non-minimal length wavelet filter (TS-wavelet) from the next data stripe must be taken into consideration in the procedure as a "preview". After the first stripe has been processed completely, the "preview" part is processed again with subsequent "preview" parts as a contained image, and this procedure is repeated again and again until all stripes have been processed individually and at all levels. The disadvantage of this technique is that it requires an extremely large amount of memory since almost all lines must be saved twice due to the intermediate "preview" step. To reduce the memory requirements somewhat, the procedure in DE 196 26 615 performs a vertical, two-dimensional wavelet transformation with a minimal length S-wavelet filter—a filter with poor transformation qualities.

To overcome this problem it has been proposed that a multi-stage transformation be achieved by using the low-pass region of a stage with any number of dimensions as the input value for the following stage (see "Ingenieur der Kommunikationstechnik", IK 2 (1997), p. 39 ff.). Here, however, the complete low-pass region of the previous stage must be available to carry out the next stage of the transformation. This procedure requires an equally large amount memory in order to store the complete image.

Before describing the present invention in detail, a description of some important basic topics follows:

"Data compression" refers to techniques and methods that map data or symbols to code words because the storage of the code words requires fewer bits than the original data. Data compression is thus a useful tool for saving or transmitting large amounts of data.

The input symbols can be one-, two- or multidimensional and generally represent physical quantities, for example, the spatial light intensity distribution of an image signal or the temporal sound waves of an audio signal. One-dimensional signals can represent, for example, temporal or spatial changes in a single direction, two-dimensional signals can represent spatial changes in two directions and multidimensional signals can represent, for example, the temporal or spectral changes of spatially changing physical quantities.

The wide range of techniques and methods for data compression can be grouped into lossy compression and lossless compression. The use of lossy compression techniques generally results in a loss of information, i.e. it cannot be guaranteed that the original data can be perfectly recreated from the compressed data. Lossy compression techniques are used when differences between the original data and the reconstructed data are acceptable. Lossless compression techniques are used when a prefect reconstruction of the original data is required.

A wavelet transformation can be expressed as a mathematically defined, linear mapping of a space $R^n \rightarrow R^n$. The mapping function can be written in the form of a linear convolution operation. In this form the signal f is analyzed with the help of the wavelet functions $\psi$. This is described by the following formula:

$$L_\psi(a, b) = |a|^{-\frac{1}{2}} \int_R f(t)\psi\left(\frac{t-b}{a}\right) dt$$

Here, $L_\psi$ represents the wavelet transformation relative to the wavelet function $\psi$. This type of wavelet transformation is also referred to as a continuous wavelet transformation.

If time-discrete or sampled signals constitute the input value range of the wavelet transformation then it is referred to as a discrete wavelet transformation. A simple and fast formula exists that describes this form of discrete wavelet transformation. Here, a wavelet transformation is carried out using a set of digital filters. A full set of wavelet filters consists of 4 individual digital filters grouped into two filter pairs. One pair is referred to as the analysis filter pair while the other is referred to as the synthesis or reconstruction filter pair. Each of the filter pairs consists of a high-pass and a low-pass filter.

Figure 1:
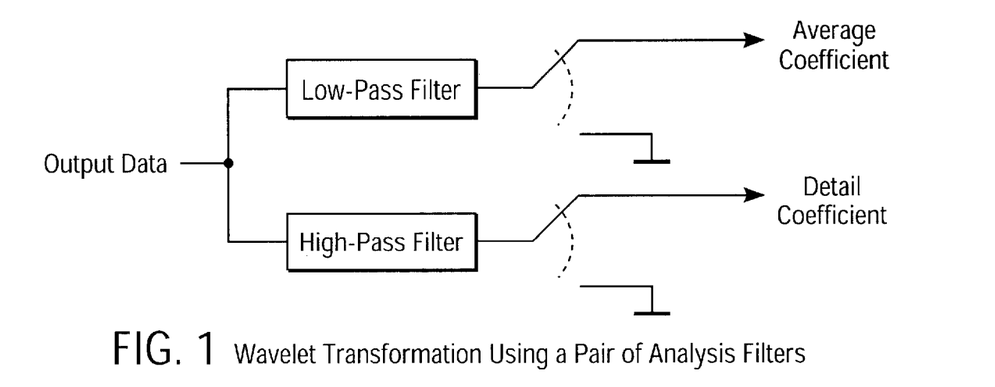
FIG. 1 shows a diagram of a wavelet transformation using a pair of analysis filters.

As shown in FIG. 1, the input signal x(t), which in the discrete case is a row of discrete values $x_i$ is linked to the high-pass and the low-pass of the analysis filter pair with the help of a digital FIR filter. The result of both filter operations is down-sampled by suppressing every second output value. The output result of the high-pass analysis filter is referred to as the high-pass or detail coefficient while the result of the low-pass analysis filter is referred to as the low-pass or average coefficient.

Figure 2:
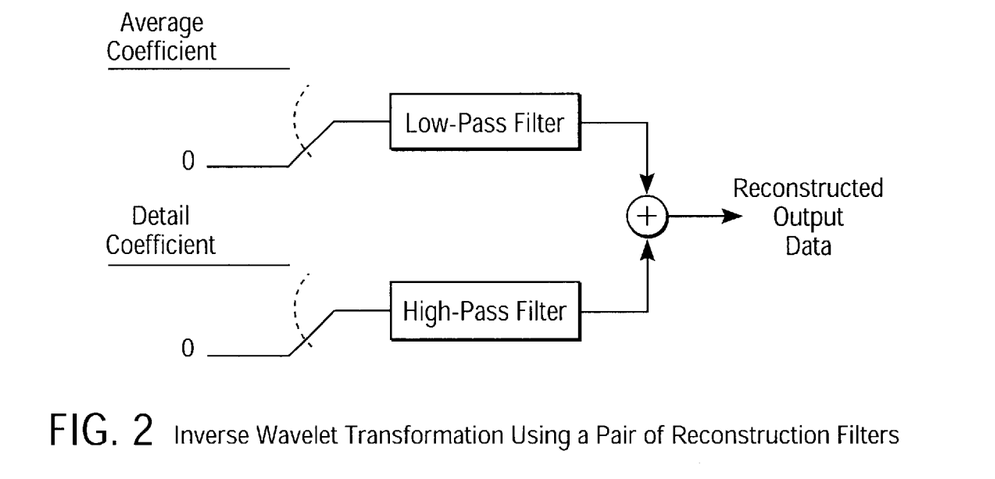
FIG. 2 shows a diagram of a wavelet transformation (Wavelet Reconstruction) using a pair of reconstruction filters.

As shown in FIG. 2, a reverse of this wavelet transformation is achieved using a reconstruction filter pair (FIG. 2).

Figure 3:
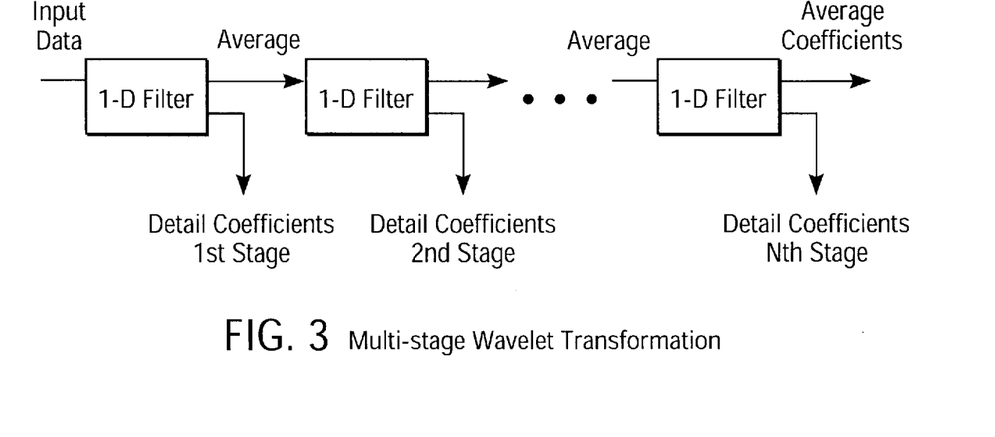
FIG. 3 shows a diagram of a multi-stage wavelet transformation.

As shown in FIG. 3, for a multi-stage wavelet transformation, the results of the low-pass filtering, the average coefficients, undergo further, single-stage wavelet transformations.

SUMMARY OF THE INVENTION

The invention can be used in a wide range of fields including space technology; for observing, measuring and surveying the earth's surface with satellites; civilian and military aeronautics; for the evaluation of x-ray images; for security systems, as well as for general industrial image processing.

The purpose of the invention is to provide the advantages of wavelet transformation, a mathematical mapping of spaces, and in particular the advantages of interpolating wavelets, for the transmission of infinitely long and continuously accumulating, non-contained images using a minimal amount of memory.

With the help of this invented procedure and the transformation unit that has been proposed for its realization, a complete wavelet transformation system has been created which performs the decorrelating transformation of input data of various types, for example audio or image data, digital or digitized analog data.

The invention also includes an inverse wavelet transformation system for reversing the wavelet transformation system procedures.

This invention concerns a procedure for multidimensional, discrete wavelet-transformation, for example, digital or digitized analog data with interpolated wavelets, as well as a transformation unit to implement the procedure, which may be used, for example, for subsequent data compression.

The invention can be used in a wide range of fields including space technology; for observing, measuring and surveying the earth's surface with satellites; civilian and military aeronautics; for the evaluation of x-ray images; for security systems, as well as for general industrial image processing.

A key feature of the invention is the possibility of performing exact, multidimensional wavelet transformation using a very limited amount of memory. Another important aspect is that this invention can be used to perform a multidimensional transformation of data that extends infinitely in one dimension. For example, it is possible to transform images with an unlimited height, audio data with an unlimited duration, or a continuous video stream. In addition the invention enables the execution of multidimensional wavelet transformation on serial input data. This process is performed by calculating the coefficients used by the "predict" and "update" operations from original image data.

DETAILED DESCRIPTION OF A PREFERRED EMBODIMENT

The following description is of the best presently contemplated mode of carrying out the invention. The description is made for the purpose of illustrating the general principles of the invention and is not to be taken in a limiting sense.

The purpose of the invention is to provide all the advantages of wavelet transformation, in particular the application of interpolated wavelets, for the transmission of infinitely long and continuously accumulating, non-contained images while using a minimal amount of memory storage. The phrase "interpolating wavelets" as described in the present invention is defined as the computation of the coefficients used in a "predict" and update" step using the original image data.

In particular, this invention presents a procedure and a circuit diagram which perform a lossless/lossy, two-dimensional, multi-stage wavelet transformation in order to later conduct, for example, lossy/lossless data compression with the transformed (image) data and the help of the appropriate coding procedure.

The invention consists of the procedure described in patent claims 1–4 for a multi-dimensional, discrete wavelet transformation with interpolated wavelets as well as the transformation unit described in claims 5–8 for implementing the procedure. This constitutes a full wavelet transformation system with decorrelating transformation of input data of various types, for example audio or image data, digital data or digitized analog data. The invention also includes an inverse wavelet transformation system to reserve the wavelet transformation.

The input signal source can be either digital memory or a digital channel. The output data is also in digital form. It can be stored either directly in digital memory or transmitted over a digital channel in direct, lossless/lossy code.

A possible way of implementing this transformation system in hardware is described and illustrated in FIG. 3.

In contrast to carrying out wavelet transformations in the form of digital filtering, this invention implements interpolated wavelet transformation.

As set forth in this invention, interpolated wavelet transformation is carried out in two steps. The first transformation step is called "Predict". The second transformation step, "Update", concludes a single-stage transformation. The individual steps are executed with the help of digital filters with finite impulse response (FIR-filters). In contrast to conventional wavelet transformation procedures, the filters here are not used separately as high-pass and low-pass filter pairs. Instead, they are linked to each other and used simultaneously. In contrast to general wavelet transformation, interpolated wavelet transformation with FIR-filters requires significantly less memory and computing instructions to perform an identical wavelet transformation with non-minimal length wavelet filters. The coefficients of interpolated wavelet transformation can either be defined using the coefficients of an equivalent high- and low-pass pair or they can be defined adaptively using the content of the input data.

In the following examples of the procedure, the invention for the transformation of digital data or digitized analog data is illustrated, with either digital memory or a digital channel serving as an input signal source. The output data is also in digital form and can be stored directly in digital memory or transmitted over a digital channel in direct, lossless/lossy coded form.

Figure 4:
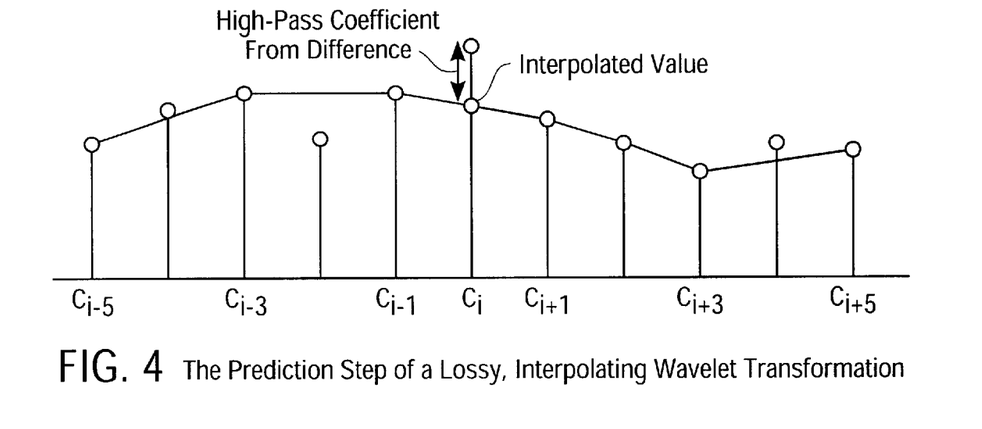
FIG. 4 shows a graph of a resulting computation of high-pass coefficients (predict step) of a lossy interpolating wavelet transformation.
Figure 5:
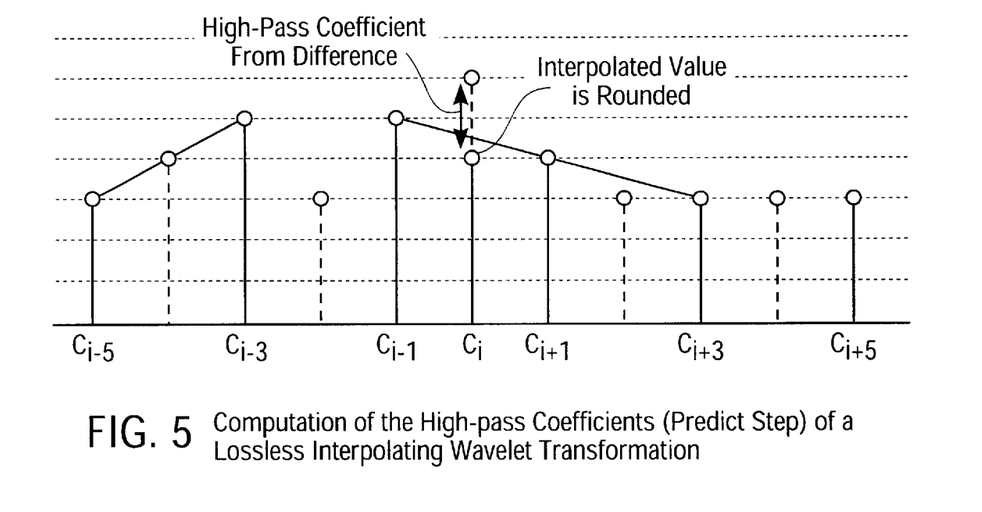
FIG. 5 shows a diagram of the resulting computation of the high-pass coefficients (predict step) of a lossless interpolating wavelet transformation as shown in a graph in FIG. 4.
Figure 6:
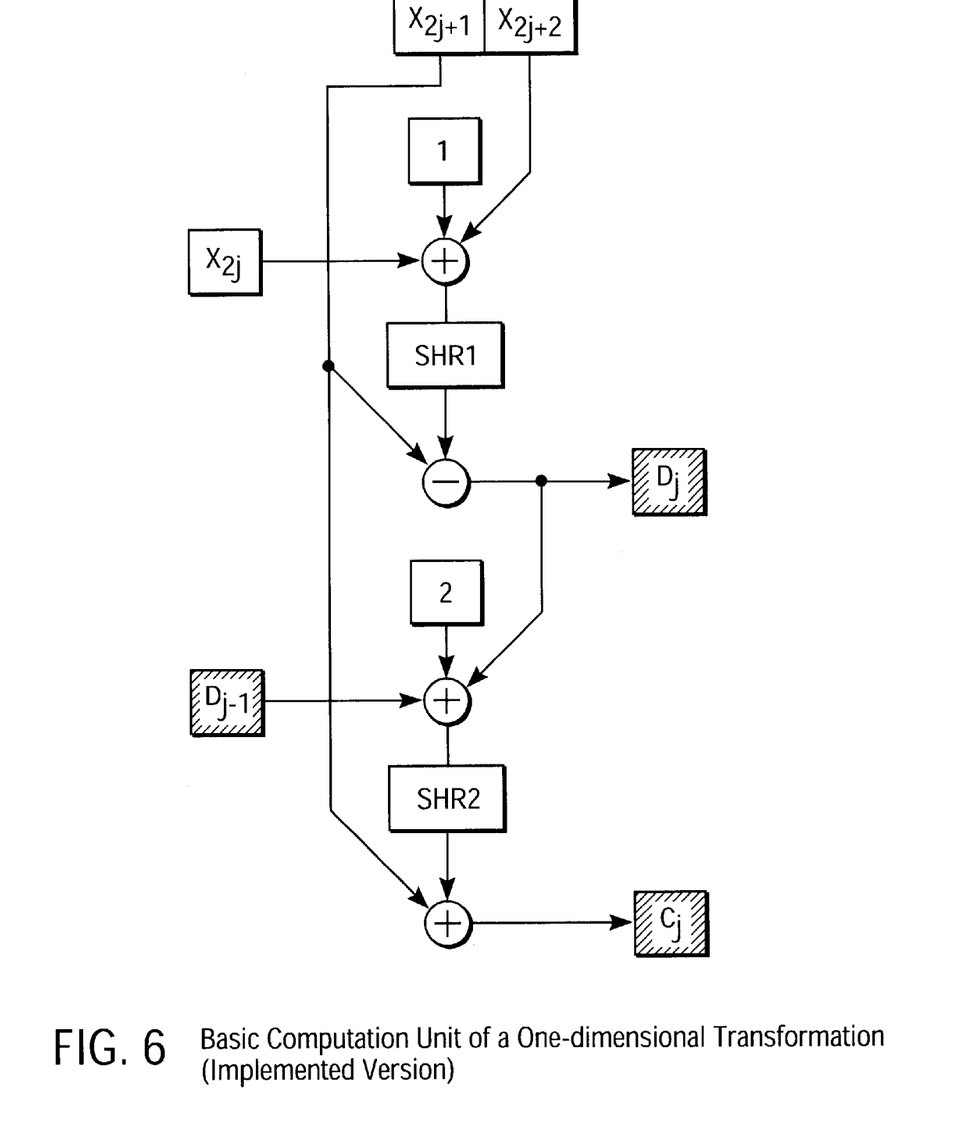
FIG. 6 shows a diagram of a basic computation unit of a one-dimensional transformation (implemented version).

Three examples of the application of the present invention are described below. Example 1 as shown in FIG. 4 embodies Interpolated wavelet transformation for lossy compression. Example 2 as shown in FIG. 5 embodies interpolated wavelet transformation for lossless compression. Example 3 as shown in FIG. 6 embodies a circuit diagram for the implementation of the procedures in hardware (transformation unit).

EXAMPLE 1

Interpolated Wavelet Transformation for Lossy Compression

The transformation is executed in two interdependent steps whereby the first step, the prediction step, generates the high-pass coefficients. The coefficients' specific input positions are predicted as accurately as possible using the coefficient values of neighboring input positions. This is achieved by the calculation of a weighted sum of the neighboring down-sampled coefficient values (mutual linear combination). This difference between the actual coefficient value and the predicted value is the high-pass coefficient or the detail coefficient.

The linear combination coefficients can be calculated by modifying existing, well-known algorithms such as Schur-Recursion or the Levinson-Durbin Algorithm.

FIG. 4 illustrates the prediction step of a one-dimensional, lossy interpolated wavelet transformation. The following formulas describe the execution of the prediction step.

$D_i$ represents the high-pass coefficient (detail coefficient) with index i.

$C_i$ represents the input value at position i.

$C_i^*$ represents the interpolated pixel value at position i.

$D_i$ is calculated as follows:

$$D_i = C_i - C_i^*$$

whereby $C_i^*$ is the mutual linear combination resulting from the down-sampled input sequence:

$$C_i^* = a_0 \cdot C_{i-1} + a_1 \cdot C_{i+1} + a_2 \cdot C_{i-3} + a_3 \cdot C_3 + \ldots + a_n C_{i+n}$$

During the update step of the interpolated wavelet transformation, a correction value is calculated from the result of the prediction step (the detail coefficient). With this correction value, the still unaltered input values are corrected so that the average of the corrected values and the average of the original values are the same. This is achieved using a mutual linear combination similar to that used in the prediction step.

$M_i$ represents the low-pass coefficient (average coefficient) with index i.

$K_i^*$ represents the correction value at position i.

$M_i$ is calculated as follows:

$$M_i = C_i + K_i^*$$

whereby $K_i^*$ is a mutual linear combination derived from the high-pass coefficients calculated in the prediction step:

$$K_i^* = b_0 \cdot D_{i-1} + b_1 \cdot D_{i+1} + b_2 \cdot D_{i-3} + b_3 \cdot D_{i+3} + \ldots + b_m \cdot D_{i+m}$$

The calculation of the coefficients $b_0 \ldots b_m$ can be achieved with methods similar to those used for the prediction step coefficients.

EXAMPLE 2

Interpolated Wavelet Transformation for Lossless Compression

By slightly modifying the calculations used in the prediction and update steps, a transformation that works with integers can be performed which thus makes lossless data compression possible.

To achieve this, the value calculated by a linear combination in the prediction step is rounded to the next integer, ensuring that the detail coefficient is an integer. Similarly, the correction value calculated in the update step is rounded to the next integer, ensuring that the result of the transformation is also an integer, which makes lossless compression possible. The following formulas illustrate the procedure (FIG. 5).

$D_i$ represents the high-pass coefficient (detail coefficient) with index i.

$C_i^*$ represents the interpolated pixel value at position i.

$C_i$ represents the input value at position i.

$D_i$ is calculated as follows:

$$D_i = C_i - C_i^*$$

whereby $C_i^*$ is a mutual linear combination derived from the down-sampled input series and rounded to the next integer. Here, the rounding to the next integer is expressed by a rounding off of the coefficient value which has been artificially raised by 0.5.

$$C_i^* = \lfloor a_0 \cdot C_{i-1} + a_1 \cdot C_{i+1} + a_2 \cdot C_{i-3} + a_3 \cdot C_{i+3} + \ldots + a_n C_{i+n} + 0.5 \rfloor$$

The update step is described by the following formulas:

$M_i$ represents the low-pass coefficient (average coefficient) with index i.

$K_i^*$ represents the correction value at position i.

$M_i$ is calculated as follows:

$$M_i = C_i + K_i^*$$

whereby $K_i^*$ is a mutual linear combination derived from the high-pass coefficients with correct rounding calculated in the prediction step:

$$K_i^* = \lfloor b_0 \cdot D_{i-1} + b_1 \cdot D_{i+1} + b_2 \cdot D_{i-3} + b_3 \cdot D_{i+3} + \ldots + b_m \cdot D_{i+m} + 0.5 \rfloor$$

Unlike other wavelet transformation methods, the interpolated wavelet transformation demonstrated by this invention also enables the execution of a transformation and an exact reconstruction of data with odd-numbered signal dimensions (one-dimensional signals with an uneven number of sampled values, odd-numbered height and width of images), given that the coefficients of the linear combination are symmetrical. It will be appreciated that this can also be achieved using "predict" and "update" wavelet transformation.

If the transformation steps are carried out several times in a row and the transformation direction of the individual steps alternates, then a multidimensional, multi-stage wavelet transformation can be achieved.

Thus, a two-dimensional, single-stage transformation requires the following steps:

1. One-dimensional transformation of a row in the horizontal direction.

2. Alternating, one-dimensional transformation of the next rows with one input value pair each in the horizontal direction. The results of this transformation along with the results of the horizontal transformation of the previous rows form an input value vector for a one-dimensional transformation in the vertical direction. These results can then in turn be used as the input values for a one-dimensional transformation in another direction, and so on.

3. Return to step 1.

EXAMPLE 3

Circuit Diagram of the Transformation Unit

Figure 7:
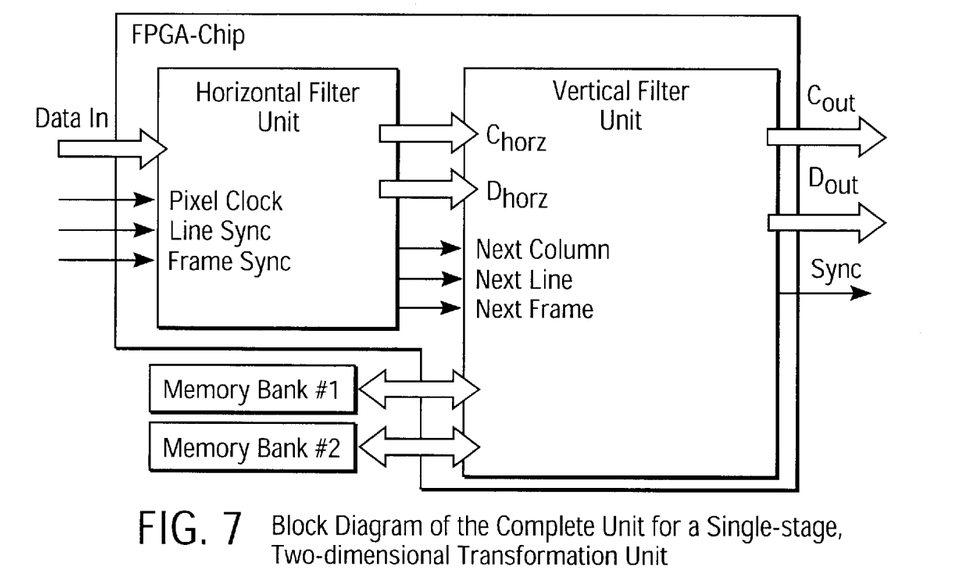
FIG. 7 shows a schematic of a two-dimensional wavelet transformation implementation.
Figure 8:
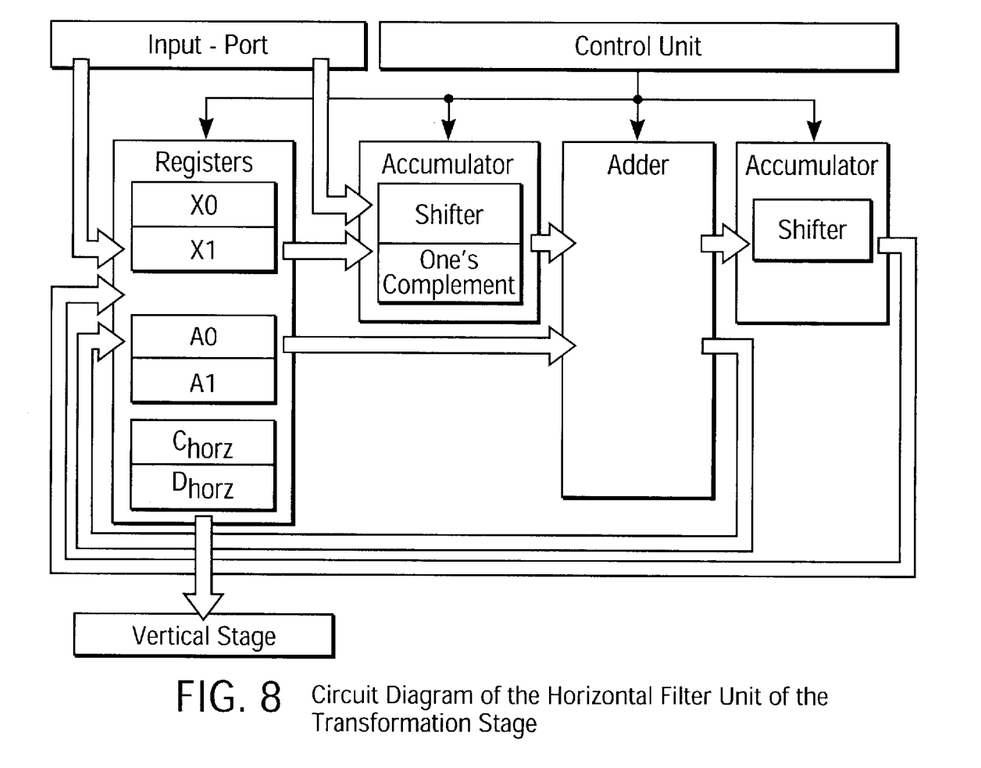
FIG. 8 shows a diagram of an horizontal transformation unit of a two-dimensional wavelet transformation implementation.
Figure 9:
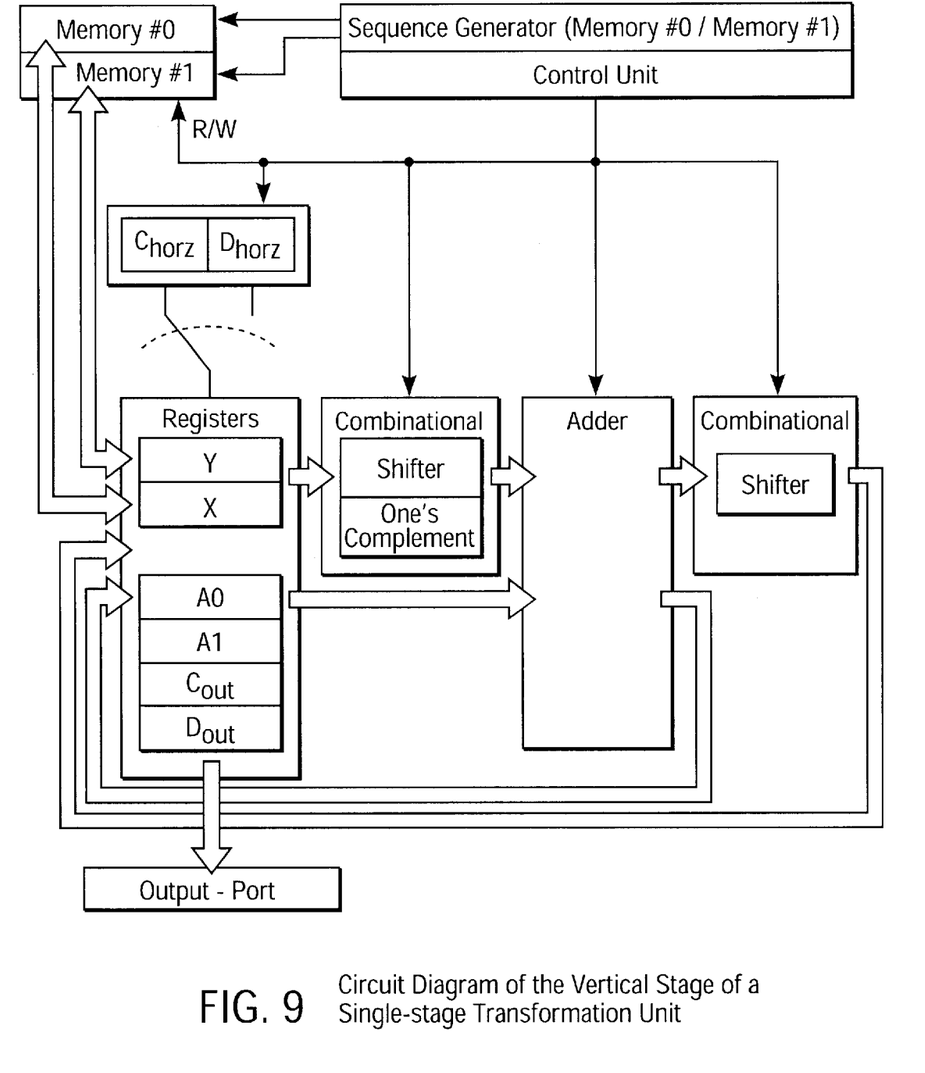
FIG. 9 shows a diagram of a vertical transformation unit of a two-dimensional wavelet transformation implementation.

The implementation of the invention consists of two one-dimensional filter units, each of which can perform a one-dimensional, interpolated wavelet transformation, a control unit, and a memory unit, which can store intermediate values that arise during the calculation (FIG. 7).

A detailed block diagram of the one-dimensional filter unit as shown in FIGS. 6–9 show the unique circuit diagram that performs a interpolated wavelet transformation and edge treatment in the horizontal and vertical directions. In this version, a symmetrical linear combination is used, with the coefficient of value 0.5 for the prediction step and 0.25 for the update step. With these values, the hardware can calculate the linear combinations using simple shift and addition operations, for which a register set, fixed shifter and an adder are required. As described above, the coefficients are not calculated using the input values. With these values the present invention forms with minimal memory an implementation of a general wavelet transformation.

The control unit consists of a counter and an accumulator. The control unit controls the adder and the shifter according to a fixed pattern synchronized to the incoming values and synchronization data.

For the calculation of a single-stage, two-dimensional transformation, the memory unit must be large enough to store the number of intermediate values that would be contained in the data amount of 2 input rows.

It can therefore be appreciated that a new and novel system and method for a multidimensional discrete wavelet-transformation has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims.

We claim:

1. A method for multidimensional, discrete wavelet transformation for use with digital or digitized analog data with interpolated wavelets, wherein low-pass output of one transformation stage with any number of dimensions is used as input for a following transformation stage, the method comprising:

processing an input data value upon its entry into a transformation unit that links the input data value to at least one of a preceding input data value and a previously calculated intermediate result;

performing a single-stage, interpolated wavelet transformation in a "predict" step and an "update" step, wherein each step is performed using digital filters with a finite impulse response to determine one or more high and low pass regions; and replacing a two-dimensional transformation that includes a first dimension of n input values which requires n transformation units for transformation of n output values (n/2 high-pass, n/2 low-pass) of the first dimension (horizontal) in the direction of the second dimension (vertical) or a plurality of n transformation units of the second dimension with one transformation unit having n-times a cache memory, wherein $n_1 \cdot n_2 \cdot \ldots \cdot n$ transformation units are required for an expansion from k to k+1 dimensions with $n_1 \ldots n$ input values of dimensions 1 . . . to transform an $n_1 \cdot n_2 \cdot \ldots \cdot n$ output values of a k dimension and wherein the digital data may expand infinitely in one of the k-dimensions.

2. The method as recited in claim 1, wherein filter coefficients of an adaptive wavelet transformation are dependent on the input data value.

3. The method of claims 1 and 2, further including:

correct rounding during the predict and update steps for an inverse wavelet-transformation with integer input and output values.

4. The method as recited in claim 3, wherein the inverse wavelet transformation is achieved by performing all of a plurality of processing steps in reverse order.

5. The method of claim 1, wherein a transformation unit for performing the multidimensional, discrete wavelet transformation comprises:

a linked ladder network of multiple single-stage filter units, each composed of a horizontal and vertical filter unit, wherein a vertical filter unit communicates over memory interfaces with two buffers which are used to store at least one calculated intermediate value; and a special serial interface for the output of high and low pass coefficients.

6. The method as recited in claim 5 wherein for the transformation unit an input data stream of a horizontal filter unit is provided by a serial pixel stream and is controlled by synchronization signals.

7. The method as recited in claims 5 and 6, wherein an inverse transformation unit for performing the multidimensional, discrete wavelet transformation includes:

a linked ladder network of multiple, single-stage filter units, each composed of a horizontal and vertical filter unit, wherein the vertical filter unit communicates over memory interfaces with two buffers that are used to store calculated intermediate values; and special serial interfaces for input of the high and lowpass coefficients.

8. The method as recited in claim 7, wherein for the transformation unit an output data stream of the horizontal filter unit is provided from a serial pixel stream and is controlled by synchronization signals.

9. The method as recited in claims 5 and 6, wherein a control unit of the transformation unit includes a counter and an accumulator, and controls an addition unit and a shifter unit synchronized to input values and synchronization data.

10. The method as recited in claim 7, wherein a control unit of the transformation unit includes a counter and an accumulator, and controls an addition unit and a shifter unit synchronized to input values and synchronization data.

11. The method as recited in claim 8, wherein a control unit of the transformation unit includes a counter and an accumulator, and controls an addition unit and a shifter unit synchronized to input values and synchronization data.

* * * * *